US012786653B2

(12) United States Patent
Trevino

(10) Patent No.: US 12,786,653 B2
(45) Date of Patent: Nov. 3, 2026

(54) INFORMATION PROCESSING METHOD, INFORMATION PROCESSING SYSTEM, AND PROGRAM

(71) Applicant: Yamaha Corporation, Hamamatsu (JP)

(72) Inventor: Jorge Trevino, Hamamatsu (JP)

(73) Assignee: YAMAHA CORPORATION, Shizuoka (JP)

( * ) Notice: Subject to any disclaimer, the term of this patent is extended or adjusted under 35 U.S.C. 154(b) by 129 days.

(21) Appl. No.: 18/800,094

(22) Filed: Aug. 11, 2024

(65) Prior Publication Data

US 2024/0406653 A1 Dec. 5, 2024

Related U.S. Application Data

(63) Continuation of application No. PCT/JP2022/040606, filed on Oct. 31, 2022.

(60) Provisional application No. 63/311,054, filed on Feb. 17, 2022.

(30) Foreign Application Priority Data

May 23, 2022 (JP) ................................ 2022-083957

(51) Int. Cl.
*H04S 7/00* (2006.01)

(52) U.S. Cl.
CPC .................................... *H04S 7/30* (2013.01)

(58) Field of Classification Search
CPC . H04S 7/30; H04S 7/302; H04S 7/308; H04S 7/303; H04S 7/305; H04S 3/00; H04R 3/04; H04R 3/12; G06F 3/16; G10L 21/00
See application file for complete search history.

(56) References Cited

U.S. PATENT DOCUMENTS 5,040,220 A * 8/1991 Iwamatsu .............. H03G 5/005 381/63
2004/0187672 A1 9/2004 Ito
2005/0117753 A1* 6/2005 Miura ..................... H04S 3/008 381/310

(Continued)

FOREIGN PATENT DOCUMENTS

JP 2004-294712 A 10/2004

OTHER PUBLICATIONS

1 International Search Report in PCT/JP2022/040606, dated Dec. 13, 2022.

(Continued)

*Primary Examiner* — Rasha S Al Aubaidi
(74) *Attorney, Agent, or Firm* — Spencer Fane LLP

(57) ABSTRACT

An information processing method realized by a computer system includes acquiring a first sound field parameter representing a feature of a first sound field and a second sound field parameter representing a feature of a second sound field, and generating a third sound field parameter representing a feature of a third sound field by using the first sound field parameter and the second sound field parameter. The first sound field has first acoustic characteristics different from second acoustic characteristics of the second sound field. The third sound field has third acoustic characteristics different from the first acoustic characteristics and the second acoustic characteristics.

10 Claims, 10 Drawing Sheets

(56) References Cited

U.S. PATENT DOCUMENTS

| | | | | |
|---|---|---|---|---|
| 2015/0098597 | A1 * | 4/2015 | Kulavik | H04S 3/004<br>381/309 |
| 2023/0362537 | A1 * | 11/2023 | Laitinen | G01S 3/8036 |
| 2025/0022475 | A1 * | 1/2025 | Breebart | H04S 3/008 |

OTHER PUBLICATIONS

Notice of Reasons for Refusal in the corresponding Japanese Patent Application No. 2022-083957, dated Oct. 16, 2025.

* cited by examiner

INFORMATION PROCESSING METHOD, INFORMATION PROCESSING SYSTEM, AND PROGRAM

CROSS-REFERENCE TO RELATED APPLICATIONS

This application is a continuation application of International Application No. PCT/JP2022/040606, filed on Oct. 31, 2022, which claims priority to Japanese Patent Application No. 2022-083957 filed in Japan on May 23, 2022. Japanese Patent Application No. 2022-083957 claims priority to U.S. Provisional Patent Application No. 63/311,054. The entire disclosures of International Application No. PCT/JP2022/040606, Japanese Patent Application No. 2022-083957 and U.S. Provisional Patent Application No. 63/311,054 are hereby incorporated herein by reference.

BACKGROUND

Technical Field

The present disclosure relates to a technology for controlling a sound field.

Background Information

Various techniques for controlling the sound field perceived by listeners have been proposed in the prior art. For example, Japanese Laid-Open Patent Application No. 2017-191980 discloses a technology for calculating a group of sound field information parameters from signals recorded by a plurality of microphones and moving an origin point of the sound field information parameter group using a translation operator, thereby generating a new sound field information parameter group.

SUMMARY

With the popularization of sound reproduction technology such as high order ambisonics technology as a backdrop, there is a high demand for the reproduction of various sound fields. In consideration of such circumstances, an object of one aspect of this disclosure is to reproduce various sound fields.

Means to Solve the Problem

In order to solve the problem described above, an information processing method according to one aspect of this disclosure comprises acquiring a first sound field parameter representing a feature of a first sound field and a second sound field parameter representing a feature of a second sound field, and generating a third sound field parameter representing a feature of a third sound field by using the first sound field parameter and the second sound field parameter. The first sound field has first acoustic characteristics different from second acoustic characteristics of the second sound field. The third sound field has third acoustic characteristics different from the first acoustic characteristics and the second acoustic characteristics.

An information processing system according to one aspect of this disclosure comprises an electronic controller including at least one processor. The electronic controller is configured to acquire a first sound field parameter representing a feature of a first sound field and a second sound field parameter representing a feature of a second sound field, and generate a third sound field parameter representing a feature of a third sound field by using the first sound field parameter and the second sound field parameter. The first sound field has first acoustic characteristics different from second acoustic characteristics of the second sound field. The third sound field has third acoustic characteristics different from the first acoustic characteristics and the second acoustic characteristics.

A non-transitory computer-readable medium storing a program according to one aspect of this disclosure causes a computer system to execute a process that comprises acquiring a first sound field parameter representing a feature of a first sound field and a second sound field parameter representing a feature of a second sound field, and generating a third sound field parameter representing a feature of a third sound field. The first sound field has first acoustic characteristics different from second acoustic characteristics of the second sound field. The third sound field has third acoustic characteristics different from the first acoustic characteristics and the second acoustic characteristics.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

A: FIRST EMBODIMENT

Figure 1:
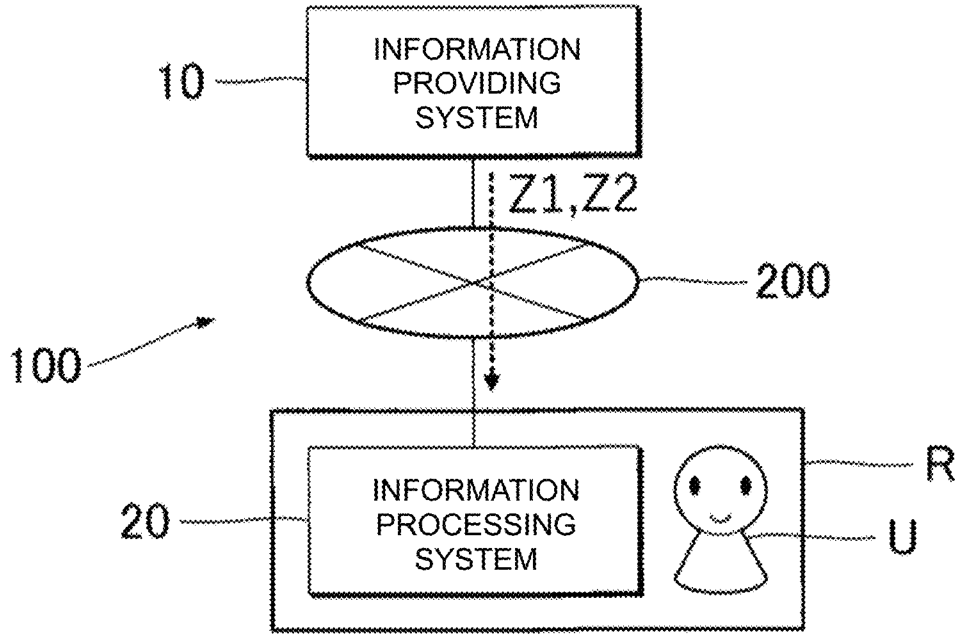
FIG. 1 is a block diagram showing a configuration of an information system according to a first embodiment.

FIG. 1 is a block diagram showing a configuration of an information system 100 according to the first embodiment. The information system 100 of the first embodiment includes an information providing system 10 and an information processing system 20. The information processing system 20 can communicate with the information providing system 10 via a communication network 200, such as the Internet. The information providing system 10 is realized by, for example, a server system, and the information processing system 20 is realized by an information device such as a smartphone, a tablet terminal, or a personal computer.

The information providing system 10 is a computer system that generates a sound field parameter Z (Z1, Z2) that represents a feature of a specific sound field. A feature of a sound field is, for example, the distribution of sound pressure of the incoming sound with respect to the listening point. Specifically, the distribution of acoustic energy on the surface of a sphere centered on the listening point is expressed by the sound field parameter Z. The sound field parameter Z of a specific sound field is also expressed as a parameter for reproducing said sound field in a given space.

The information providing system 10 of the first embodiment generates a sound field parameter Z1 representing a feature of the first sound field and a sound field parameter Z2 representing a feature of the second sound field. The first sound field and the second sound field are sound fields formed in acoustic spaces having different acoustic characteristics. For example, the first sound field and the second sound field are sound fields corresponding to different music halls. Specifically, various conditions relating to the propagation of sound waves, such as the shape, size, and sound absorption coefficient of the acoustic space, differ between the first sound field and the second sound field. Note that, in addition to a music hall designed to have specific acoustic characteristics, the first sound field or the second sound field can be an anechoic chamber in which almost no reflection occurs on the inner wall surface. In the following description, when there is no need to distinguish between the first sound field and the second sound field, the two are collectively referred to as the "observation sound field." The sound field parameter Z1 and the sound field parameter Z2 are provided to the information processing system 20 via the communication network 200. Note that the sound field parameter Z1 is one example of the "first sound field parameter" and the sound field parameter Z2 is one example of the "second sound field parameter."

The information processing system 20 is installed in an acoustic space R in which is situated a user U. The information processing system 20 generates a sound field parameter Z3 by using the sound field parameter Z1 and the sound field parameter Z2. The sound field parameter Z3 is a parameter representing a feature of a third sound field having acoustic characteristics different from those of the first sound field and the second sound field. Specifically, the third sound field is a sound field having acoustic characteristics (third acoustic characteristics) that are intermediate between those of the first sound field and the second sound field. That is, the third sound field is a sound field on which the acoustic characteristics of both the first sound field and the second sound field are reflected. Note that the third sound field is not limited to a sound field on which the acoustic characteristics (first acoustic characteristics) of the first sound field and the acoustic characteristics (second acoustic characteristics) of the second sound field are equally reflected. For example, a sound field on which the first sound field is more predominantly reflected than the second sound field, and a sound field on which the second sound field is more predominantly reflected than the first sound field, are also included in the "third sound field." The information processing system 20 uses the sound field parameter Z3 to reproduce the third sound field in the acoustic space R. That is, the information processing system 20 controls sound reproduction such that the user U inside the acoustic space R perceives the third sound field. Note that the sound field parameter Z3 is one example of the "third sound field parameter."

Information Providing System 10

Figure 2:
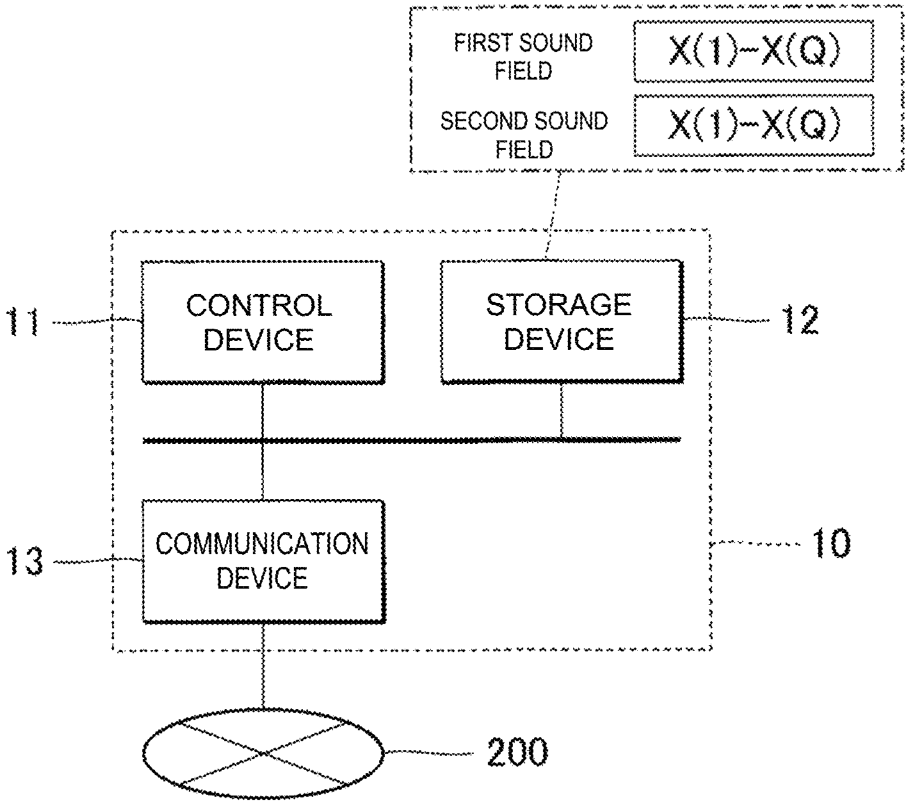
FIG. 2 is a block diagram showing a configuration of an information providing system.

FIG. 2 is a block diagram showing a configuration of the information providing system 10. The information providing system 10 includes a control device (electronic controller) 11, a storage device 12, and a communication device 13. The information providing system 10 can be realized as a single device, or as a plurality of devices which are separately configured.

The control device 11 (electronic controller) is, for example, one or a plurality of processors that control each element of the information providing system 10. Specifically, for example, the control device 11 includes one or a plurality of types of processors, such as a CPU (Central Processing Unit), an SPU (Sound Processing Unit), a DSP (Digital Signal Processor), an FPGA (Field Programmable Gate Array), an ASIC (Application Specific Integrated Circuit), and the like. The term "electronic controller" as used herein refers to hardware that executes software programs.

The communication device 13 communicates with the information processing system 20 via the communication network 200. For example, the communication device 13 transmits the sound field parameter Z1 and the sound field parameter Z2 to the information processing system 20. The term "communication device" as used herein includes a receiver, a transmitter, a transceiver and a transmitter-receiver, capable of transmitting and/or receiving communication signals. Note that communication between the communication device 13 and the communication network 200 can be either wired communication or wireless communication.

The storage device 12 includes one or more memory units (one or more computer memories) for storing a program that is executed by the control device 11 and various data that are used by the control device 11. A known storage medium, such as a magnetic storage medium or a semiconductor storage medium, or a combination of a plurality of various types of storage media can be used as the storage device 12. Note that, for example, a portable storage medium that is attached to/detached from the information providing system 10 or a storage medium (for example, cloud storage) that the control device 11 can access via the communication network 200 can also be used as the storage device 12.

The storage device 12 stores Q observation signals X(1)-X(Q) for each of the first sound field and the second sound field. The Q observation signals X(1)-X(Q) corresponding to the first sound field are signals representing waveforms of sound waves collected in parallel with each other in the first sound field. Similarly, the Q observation signals X(1)-X(Q) corresponding to the second sound field are signals representing waveforms of sound waves collected in parallel with each other in the second sound field.

Figure 3:
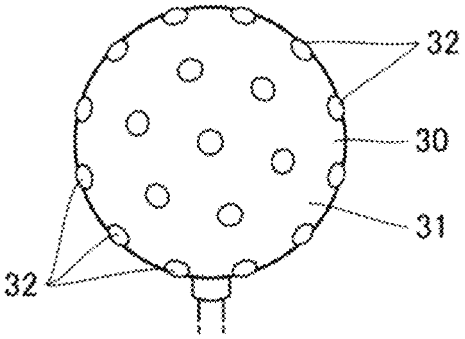
FIG. 3 is an explanatory diagram of a spherical microphone array.

A spherical microphone array 30 shown in FIG. 3 is used for the generation of the Q observation signals X(1)-X(Q) in the observation sound field (first sound field/second sound field). The spherical microphone array 30 is a sound collection device in which Q microphones 32 are dispersively disposed on the surface of a spherical housing 31 having a radius of r. Any one observation signal X(q) is a signal representing the waveform of sound collected in the observation sound field by the q-th (q=1 to Q) microphone 32, from among the Q microphones 32. The observation signal X(q) of the first sound field is recorded in state in which the spherical microphone array 30 is installed in the first sound field, and the observation signal X(q) of the second sound field is recorded in a state in which the spherical microphone array 30 is installed in the second sound field. Therefore, the acoustic characteristics of the observation sound field are reflected on each observation signal X(q).

Figure 4:
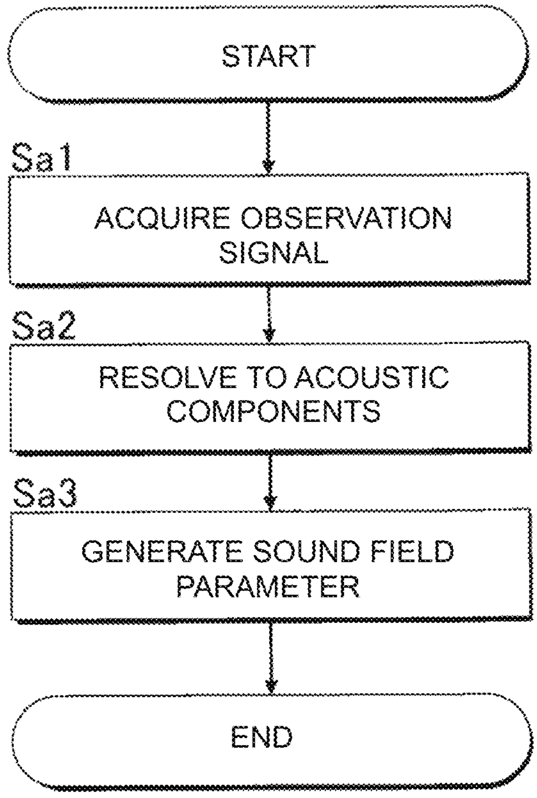
FIG. 4 is a flowchart of an analysis process.

FIG. 4 is a flowchart of a process (hereinafter referred to as "analysis process") by which the control device 11 generates the sound field parameter Z (Z1, Z2). The analysis process is executed for each of the first sound field and the second sound field. That is, the sound field parameter Z1 is generated by the analysis process relating to the first sound field and the sound field parameter Z2 is generated by the analysis process relating to the second sound field.

The control device 11 acquires, from the storage device 12, the Q observation signals X(1)-X(Q) recorded in the observation sound field (first sound field/second sound field) (Sa1). The control device 11 resolves each observation signal X(q) into K acoustic components C(q, 1)-C(q, K) (Sa2). The K acoustic components C(q, 1)-C(q, K) are components corresponding to different frequency bands in the observation signal X(q).

Figure 5:
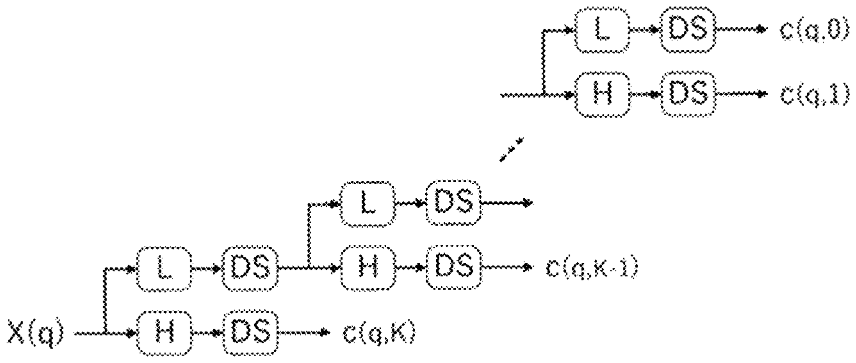
FIG. 5 is an explanatory diagram of discrete wavelet transform.

The control device 11 of the first embodiment generates the acoustic components C(q, 1)-C(q, K) from the observation signal X(q) by discrete wavelet transform. Specifically, Haar wavelets as illustrated in FIG. 5 are used for the generation of each acoustic component C(q, k). The reference symbol "H" in FIG. 5 signifies a high-pass filter (HPF), and the reference symbol "L" signifies a low-pass filter (LPF). In addition, the reference symbol "SD" signifies downsampling, which reduces the sampling frequency by half.

As illustrated in FIG. 5, one approximate component c (q, 0) and K detailed components c (q, 1)-(q, K) are generated by discrete wavelet transform. The control device 11 generates the K acoustic components C(q, 1)-C(q, K) by calculation of the following Equation (1).

$$C(q, k) = \frac{|c(q, k)||c(q, 0)|}{|c(q, 0)|^2 + \lambda} \tag{1}$$

The symbol λ in Equation (1) is a prescribed positive number and is set in accordance with the SN (signal-to-noise) ratio of the observation signal X(q), for example. The acoustic component C(q, k) corresponds to the sound pressure of the k-th component of the incoming sound to the q-th microphone 32 of the spherical microphone array 30.

Figure 6:
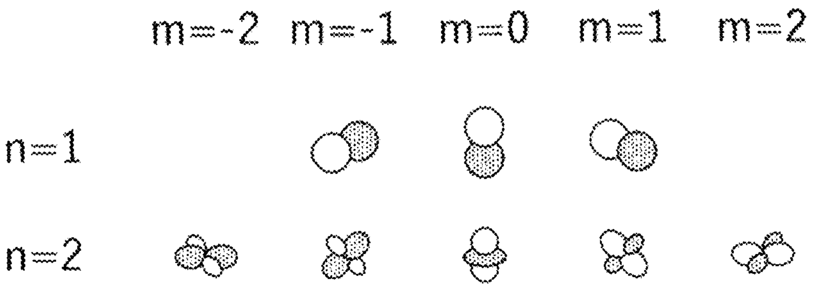
FIG. 6 is an explanatory diagram of spherical harmonics.

As shown in FIG. 4, the control device 11 generates the sound field parameter Z of the observation sound field (Sa3). The sound field parameter Z is a set of expansion coefficients Bnm(k) corresponding to the acoustic components C(q, 1)-C(q, K) in each of the Q observation signals X(1)-X(Q). As shown in FIG. 6, the expansion coefficient Bnm(k) is a weighted value (spherical harmonic coefficient) corresponding to spherical harmonics Ynm corresponding to a combination of degree n and order m. Specifically, the control device 11 calculates the expansion coefficient Bnm(k) by computation of the following Equation (2).

$$B_{nm}(k) = \frac{1}{J_n(kr)} \int_{4\pi} C(q, k) Y^*_{nm}(\Omega) d\Omega \tag{2}$$

The function Jn in Equation (2) signifies an n-th order spherical Bessel function, and the symbol * denotes the complex conjugate. The symbol dΩ denotes a surface integral. As described above, the symbol r is the radius of a spherical surface (that is, the housing 31) on which the sound waves are collected.

As can be understood from the foregoing explanation, the sound field parameter Z of the first embodiment includes a plurality of the expansion coefficients Bnm(k) corresponding to different spherical harmonics Ynm. Specifically, the sound field parameter Z includes a plurality of the expansion coefficients Bnm(k), corresponding to different combinations of degree n and order m, for each of the K frequency bands. As can be understood from the foregoing explanation, the control device 11 functions as an HOA (higher order ambisonics) encoder. The information providing system 10 transmits, to the information processing system 20, the sound field parameter Z1 of the first sound field and the sound field parameter Z2 of the second sound field generated in accordance with the procedure described above.

Information Processing System 20

Figure 7:
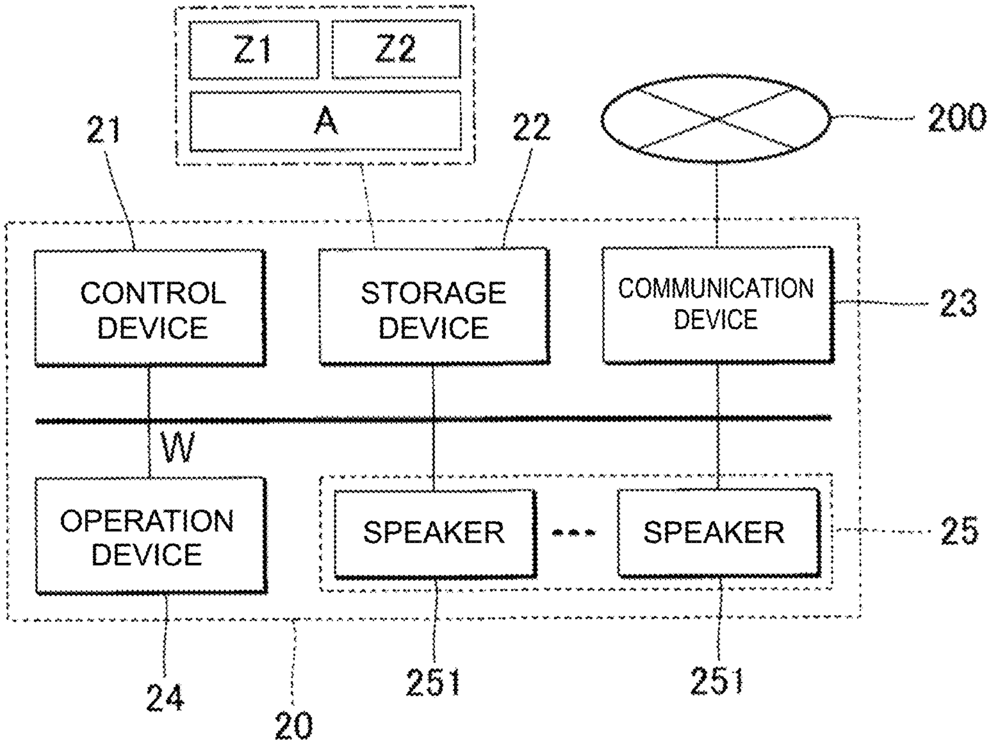
FIG. 7 is a block diagram showing a configuration of an information processing system.

FIG. 7 is a block diagram showing a configuration of the information processing system 20. The information processing system 20 is a computer system and includes a control device (electronic controller) 21, a storage device 22, a communication device 23, an operation device 24, and a reproduction system 25. Note that the information processing system 20 can be realized as a single device, or as a plurality of devices which are separately configured.

The control device (electronic controller) 21 is one or a plurality of processors that control each element of the information processing system 20. Specifically, for example, the control device 21 includes one or more types of processors, such as a CPU, an SPU, a DSP, an FPGA, an ASIC, and the like. The term "electronic controller" as used herein refers to hardware that executes software programs.

The communication device 23 communicates with the information providing system 10 via the communication network 200. For example, the communication device 23 receives the sound field parameter Z1 and the sound field parameter Z2 from the information providing system 10. Note that communication between the communication device 23 and the communication network 200 can be either wired communication or wireless communication. The term "communication device" as used herein includes a receiver, a transmitter, a transceiver and a transmitter-receiver, capable of transmitting and/or receiving communication signals.

The storage device 22 includes one or more memory units (one or more computer memories) for storing a program that is executed by the control device 21 and various data that are used by the control device 21. A known storage medium, such as a magnetic storage medium or a semiconductor storage medium, or a combination of a plurality of various types of storage media can be used as the storage device 22. Note that, for example, a portable storage medium that is attached to/detached from the information providing system 10 or a storage medium (for example, cloud storage) that the control device 21 can access via the communication network 200 can also be used as the storage device 22.

The storage device 22 of the first embodiment stores the sound field parameter Z1 and the sound field parameter Z2 received by the communication device 23. In addition, the storage device 22 stores an audio signal A. The audio signal A is a signal of a plurality of channels representing waveforms of sounds such as performance sounds or singing sounds. The data format of the audio signal A can be freely selected.

The operating device 24 is an input device (user operable input) that receives operations from the user U. For example, an operator operated by the user U, or a touch panel that detects touch by the user U, is used as the operation device 24. Note that the operation device 24 that is separate from the information processing system 20 can be connected to the information processing system 20 wirelessly or by wire.

The user U can operate the operation device 24 to provide an instruction value W to the information processing system 20. The instruction value W is a variable representing the degree to which each of the sound field parameter Z1 and the sound field parameter Z2 is reflected on the sound field parameter Z3. The instruction value W changes continuously in accordance with the operation of the user U on the operation device 24. For example, the operation device 24 includes a rotary operator, such as a rotatable knob, or a reciprocating operator, such as a slider that can be moved back and forth in a straight line. The instruction value W changes continuously in accordance with the angle of the rotary operator or the position of the reciprocating operator. Specifically, the instruction value W is set in accordance with the instruction from the user U, within the range of greater than or equal to 0 and less than or equal to 1.

The reproduction system 25 is an audio system that includes a plurality of speakers 251 corresponding to different channels. Examples of the reproduction system 25 include a surround system with three or more speakers 251, and a stereo system with two speakers 251.

The plurality of speakers 251 are disposed at different positions in the acoustic space. For example, the plurality of speakers 251 are arranged around the user U. Each of the speakers 251 is a sound output device that emits sound represented by the audio signal A. Specifically, the audio signal A of each channel is supplied to the speaker 251 of said channel, thereby emitting sound waves. Note that illustrations of a D/A converter that converts the audio signal A of each channel from digital to analog and of an amplifier that amplifies the audio signal A have been omitted for the sake of convenience. In addition, the reproduction system 25 that is separate from the information processing system 20 can be connected to the information processing system 20 wirelessly or by wire.

Figure 8:
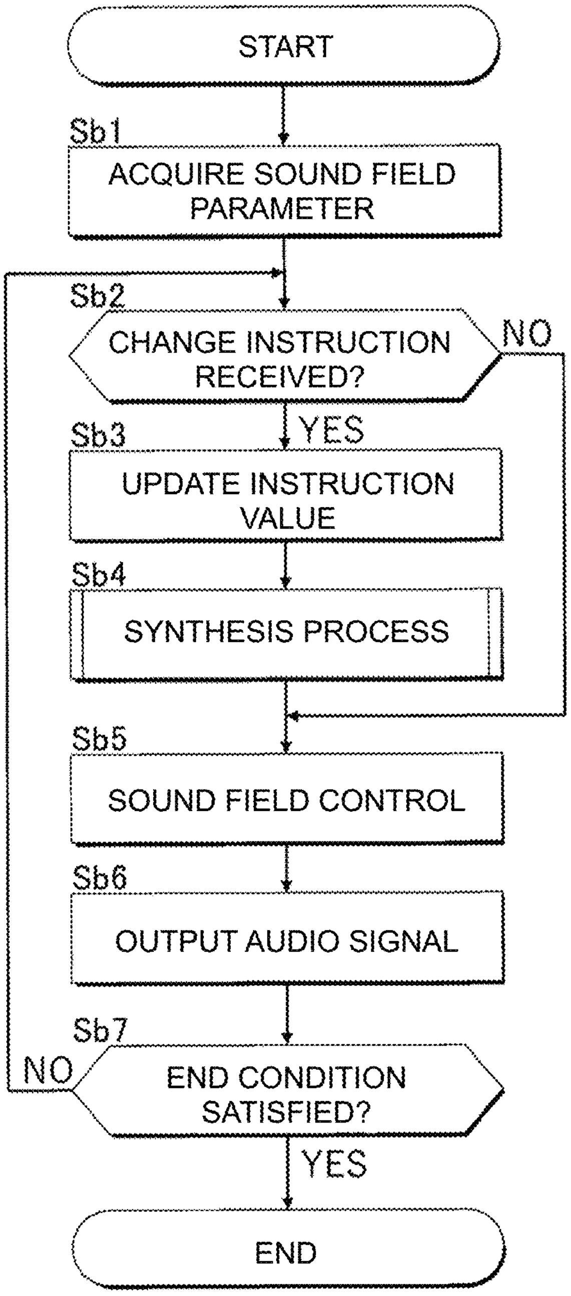
FIG. 8 is a flowchart of a reproduction process.

FIG. 8 is a flowchart of the process (hereinafter referred to as "reproduction process") that is executed by the control device 21. For example, the reproduction process is triggered by an operation of the user U on the operating device 24. When the reproduction process is started, the control device 21 acquires the sound field parameter Z1 and the sound field parameter Z2 from the storage device 22 (Sb1). As described above, the control device 21 functions as an element (acquisition unit) that acquires the sound field parameter Z1 and the sound field parameter Z2. Note that the acquisition source for the sound field parameter Z1 and the sound field parameter Z2 is not limited to the storage device 22. For example, the control device 21 can acquire, by the communication device 23 via the communication network 200, the sound field parameter Z1 and the sound field parameter Z2 transmitted from the information providing system 10.

The control device 21 determines whether an instruction to change the instruction value W has been received from the user U (Sb2). If an instruction to change the instruction value W has been received (Sb2: YES), the control device 21 updates the instruction value W to the value specified by the user U (Sb3).

The control device 21 executes a synthesis process (Sb4). The synthesis process is a process that uses the sound field parameter Z1 and the sound field parameter Z2 to generate the sound field parameter Z3. The updated instruction value W is applied to the synthesis process. On the other hand, if there is no instruction to change the instruction value W (Sb2: NO), the synthesis process (Sb4) and the updating (Sb3) of the instruction value W are not executed. As can be understood from the foregoing explanation, the control device 21 functions as an element (generation unit) that generates the sound field parameter Z3 from the sound field parameter Z1 and the sound field parameter Z2.

Figure 9:
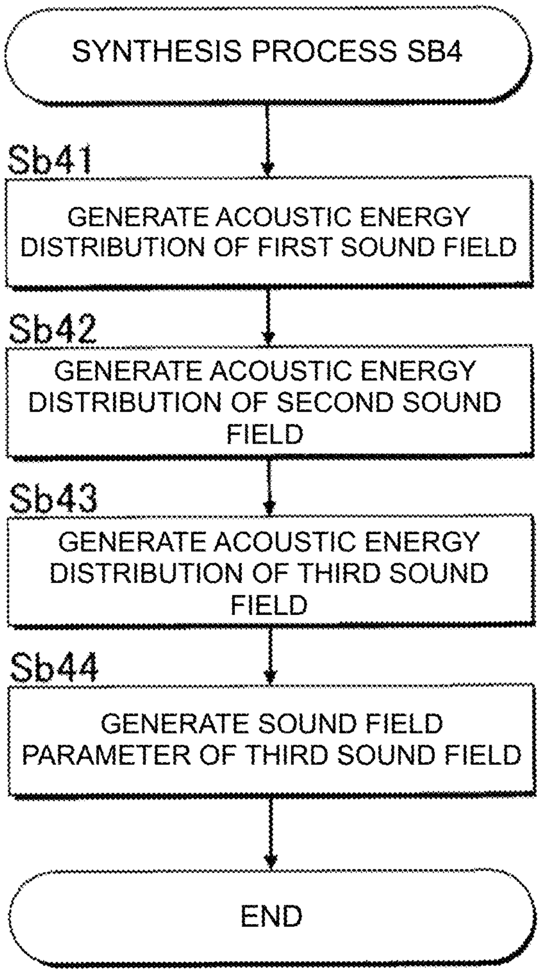
FIG. 9 is a flowchart of a synthesis process.

FIG. 9 is a flowchart of the synthesis process. When the synthesis process is started, the control device 21 generates an acoustic energy distribution D1 of the first sound field from the sound field parameter Z1 (Sb41). The acoustic energy distribution D1 is the distribution of acoustic energy (sound pressure) on the spherical surface having the radius r. Specifically, the control device 21 calculates, as the acoustic energy distribution D1, a weighted sum of the plurality of spherical harmonics Ynm to which the plurality of expansion coefficients Bnm(k) included in the sound field parameter Z1 have been applied as weighted values.

Similarly, the control device 21 generates an acoustic energy distribution D2 of the second sound field from the sound field parameter Z2 (Sb42). Specifically, the control device 21 calculates, as the acoustic energy distribution D2, a weighted sum of the plurality of spherical harmonics Ynm to which the plurality of expansion coefficients Bnm(k) included in the sound field parameter Z2 have been applied as weighted values. The order of the generation (Sb41) of the acoustic energy distribution D1 and the generation (Sb42) of the acoustic energy distribution D2 can be reversed.

Figure 10:
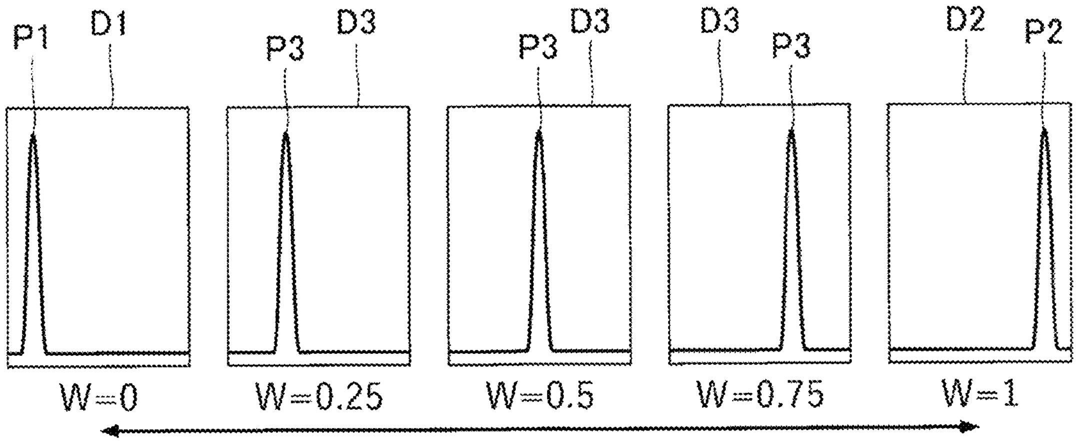
FIG. 10 is an explanatory diagram of the synthesis process.

FIG. 10 is an explanatory diagram of the synthesis process. FIG. 10 schematically illustrates the acoustic energy distribution D1 of the first sound field and the acoustic energy distribution D2 of the second sound field. The acoustic energy distribution D1 includes a peak P1 in the acoustic energy and the acoustic energy distribution D2 includes a peak P2 in the acoustic energy.

The control device 21 generates an acoustic energy distribution D3 of the third sound field such that a peak P3 of the acoustic energy is located intermediate between the peak P1 of the acoustic energy in the acoustic energy distribution D1 and the peak P2 of the acoustic energy in the acoustic energy distribution D2 (Sb43).

Specifically, the location of the peak P3 of the acoustic energy distribution D3 is set to a position obtained by internal division of the segment between the location of the peak P1 of the acoustic energy distribution D1 and the location of the peak P2 of the acoustic energy distribution D2, in accordance with the instruction value W. Specifically, as the instruction value W approaches the minimum value 0, the peak P3 of the acoustic energy distribution D3 approaches the peak P1 of the acoustic energy distribution D1, and, as the instruction value W approaches the maximum value 1, the peak P3 of the acoustic energy distribution D3 approaches the peak P2 of the acoustic energy distribution D2. If the instruction value W is set to the minimum value 0, the acoustic energy distribution D1 is applied as the acoustic energy distribution D3, and if the instruction value W is set to the maximum value 1, the acoustic energy distribution D2 is applied as the acoustic energy distribution D3. Note that the Wasserstein distance, for example, is used for the comparison between the peak P1 of the acoustic energy distribution D1 and the peak P2 of the acoustic energy distribution D2.

The control device 21 generates the sound field parameter Z3 corresponding to the acoustic energy distribution D3 generated in the foregoing process (Sb44). The sound field parameter Z3 includes a plurality of the expansion coefficients Bnm(k) corresponding to different spherical harmonics Ynm. As can be understood from the foregoing explanation, the control device 21 generates the sound field parameter Z3 on which each of the sound field parameter Z1 and the sound field parameter Z2 is reflected at a degree in accordance with the instruction from the user U. The specific procedure of the synthesis process is as described above.

As shown in FIG. 8, the control device 21 weights each of the plurality of audio signals A stored in the storage device 22 in accordance with the sound field parameter Z3 (Sb5). That is, the control device 21 controls the volume and phase of the audio signal A of each channel such that the third sound field represented by the sound field parameter Z3 is formed in the acoustic space R. That is, the control device 21 functions as an HOA decoder. Any known technique can be employed to the controlling of the sound field to which the sound field parameter Z3 is applied.

The control device 21 supplies each audio signal A that has been controlled in accordance with the sound field parameter Z3 to the speaker 251 corresponding to said audio signal A in the reproduction system 25 (Sb6). As a result of sound waves corresponding to the audio signals A being emitted from each speaker 251, the third sound field is formed in the acoustic space R. That is, the user U can perceive the third sound field that is different from the first sound field and the second sound field.

The control device 21 determines whether a prescribed end condition has been met (Sb7). An end condition is, for example, issuance of an instruction to end from the user U, or that the reproduction of all of the audio signals A has been completed. If the end condition is not satisfied (Sb7: NO), the control device 21 causes the process to proceed to Step Sb2. That is, each time an instruction to change the instruction value W is issued by the user U, the updating (Sb3) of the instruction value W and the synthesis process (Sb4), to which the updated instruction value W is applied, are executed. If the end condition is satisfied (Sb7: YES), the control device 21 ends the reproduction process.

As described above, in the first embodiment, the sound field parameter Z3 of the third sound field is generated by using the sound field parameter Z1 of the first sound field and the sound field parameter Z2 of the second sound field. Therefore, it is possible to reproduce various sound fields that are between the first sound field and the second sound field. In particular, in the first embodiment, the degrees of influence of the sound field parameter Z1 and of the sound field parameter Z2 on the sound field parameter Z3 are controlled in accordance with the instruction (instruction value W) from the user U. Therefore, it is possible to reproduce the third sound field in accordance with the intention of the user U. Additionally, in the first embodiment, the instruction value W that is applied to the generation of the sound field parameter Z3 changes continuously in accordance with the instruction from the user U. Therefore, it is possible to generate the sound field parameter Z3 for any third sound field that is in the process of continuously changing from the first sound field to the second sound field, or vice versa. That is, it is possible to morph the first sound field and the second sound field.

B: SECOND EMBODIMENT

The second embodiment will be described. In each of the embodiments illustrated below, elements that have the same functions as those in Embodiment 1 have been assigned the same reference symbols used to describe Embodiment 1 and detailed descriptions thereof have been appropriately omitted.

Figure 11:
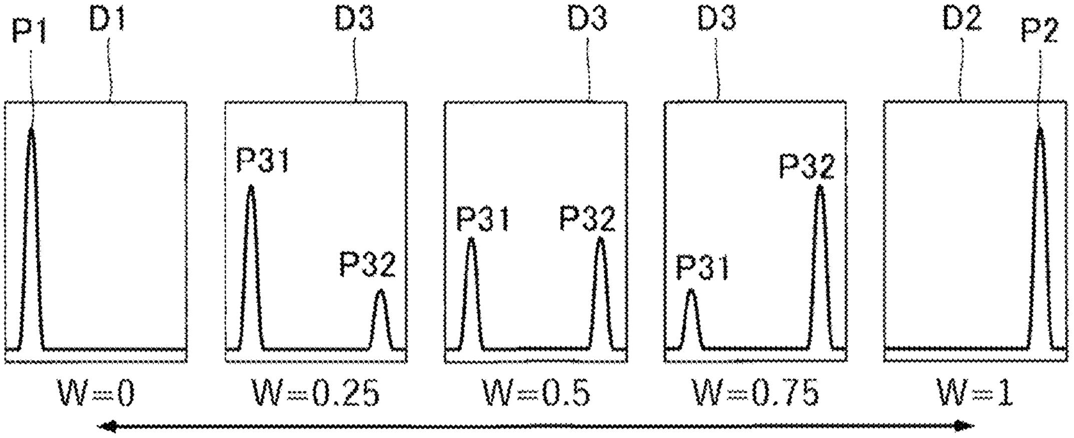
FIG. 11 is an explanatory diagram of the synthesis process in a second embodiment.

FIG. 11 is an explanatory diagram of the synthesis process in the second embodiment. As described above with reference to FIG. 10, in the synthesis process of the first embodiment, the acoustic energy distribution D3 of the third sound field is generated such that the peak P3 of the acoustic energy is located intermediate between the peak P1 of the acoustic energy in the first sound field and the peak P2 of the acoustic energy in the second sound field. In the synthesis process, the control device 21 of the second embodiment generates the sound field parameter Z3 of the third sound field from a weighted sum of the sound field parameter Z1 and the sound field parameter Z2.

Specifically, the control device 21 generates the acoustic energy distribution D3 of the third sound field from a weighted sum of the acoustic energy distribution D1 and the acoustic energy distribution D2. As shown in FIG. 11, the acoustic energy distribution D3 includes a peak P31 corresponding to the acoustic energy distribution D1 and a peak P32 corresponding to the acoustic energy distribution D2. The location of the peak P31 is the same location as the peak P1 in the acoustic energy distribution D1, and the location of the peak P32 is the same location as the peak P2 in the acoustic energy distribution D2.

The numerical value of the peak P31 in the acoustic energy distribution D3 is set to a numerical value obtained by multiplying the numerical value of the peak P1 of the acoustic energy distribution D1 by a weighted value (1-W) corresponding to the instruction value W. The numerical value of the peak P32 in the acoustic energy distribution D3 is set to a numerical value obtained by multiplying the numerical value of the peak P2 of the acoustic energy distribution D2 by the instruction value W. Therefore, as the instruction value W approaches the minimum value 0, the numerical value of the peak P31 increases and the numerical value of the peak P32 decreases. On the other hand, as the instruction value W approaches the maximum value 1, the numerical value of the peak P31 decreases and the numerical value of the peak P32 increases. If the instruction value W is set to the minimum value 0, the acoustic energy distribution D1 is applied as the acoustic energy distribution D3, and if the instruction value W is set to the maximum value 1, the acoustic energy distribution D2 is applied as the acoustic energy distribution D3.

The operations other than the synthesis process are the same as those of the first embodiment. Therefore, the same effects as those of the first embodiment can be realized by the second embodiment. In addition, in the second embodiment, the sound field parameter Z3 of the third sound field is generated from a weighted sum (for example, average) of the sound field parameter Z1 and the sound field parameter Z2. Therefore, it is possible to reduce the processing load required for the synthesis process compared to the first embodiment.

On the other hand, in the first embodiment, the sound field parameter Z3 of the third sound field is generated such that the peak P3 is located intermediate between the peak P1 of the acoustic energy distribution D1 of the first sound field and the peak P2 of the acoustic energy distribution D2 of the second sound field. Therefore, compared to the second embodiment, there is the advantage that it is possible to generate the sound field parameter Z3 of the third sound field that allows the user U to clearly perceive acoustic characteristics that are intermediate between those of the first sound field and of the second sound field.

C: THIRD EMBODIMENT

Figure 12:
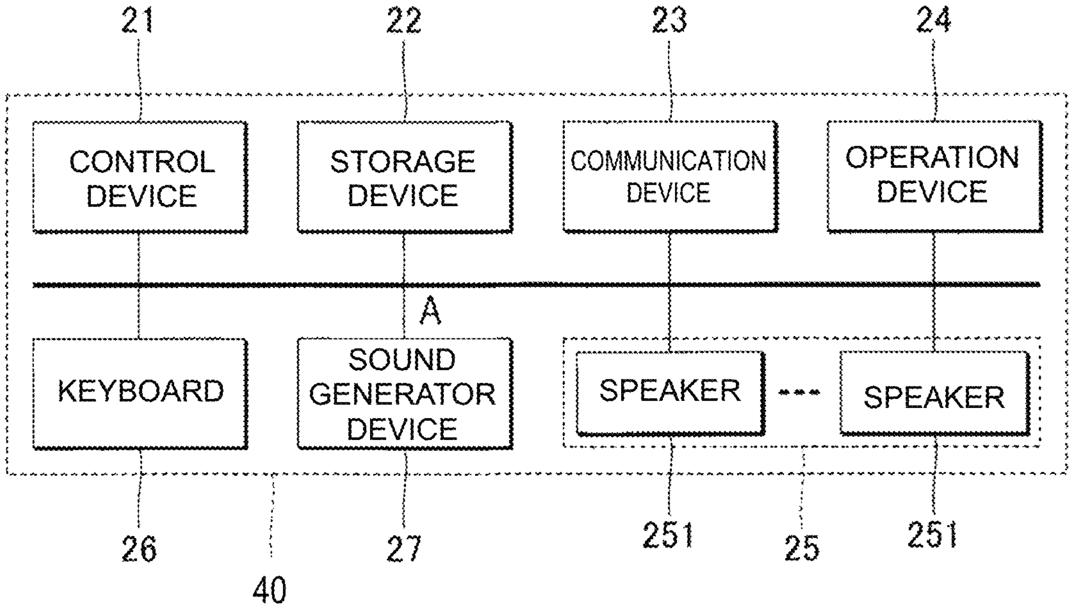
FIG. 12 is a block diagram showing a configuration of an electronic instrument according to a third embodiment.

FIG. 12 is a block diagram showing a configuration of an electronic instrument 40 according to the third embodiment.

The electronic instrument 40 is an information processing system that reproduces sound in accordance with a performance operation carried out by the user U. The electronic instrument 40 shown in FIG. 12 is an electronic keyboard instrument that includes a keyboard 26 and a sound generator device (sound generator) 27, in addition to the same elements (control device 21, storage device 22, communication device 23, operation device 24, reproduction system 25) as the information processing system 20 of the first embodiment.

The keyboard 26 includes a plurality of keys corresponding to a plurality of different pitches. The sound generator device 27 generates an audio signal A representing a musical sound of a pitch corresponding to the key that is operated on by the user U. Note that the control device 21 can execute a program to realize the function of the sound generator device 27. That is, the element (sound generation unit) that generates the audio signal A in accordance with the performance operation of the user U can be realized either by a software sound generator realized by the control device 21 or a hardware sound generator (sound generator device 27) dedicated to the generation of the audio signal A.

In the first embodiment, the sound field parameter Z3 is applied to the audio signal A stored in the storage device 22 (Sb5). The control device 21 of the third embodiment applies the sound field parameter Z3 to the audio signal A generated by the sound generator device 27. The embodiment is the same as the first embodiment other than the method of acquiring the audio signal A. Therefore, the same effects as those of the first embodiment can be realized by the third embodiment. In the description above, the third embodiment is described based on the first embodiment, but the second embodiment also can be applied to the electronic instrument 40.

In the third embodiment, as in the first embodiment, the instruction value W corresponding to the instruction issued by the user U is applied to the generation of the sound field parameter Z3 of the third sound field. Therefore, the user U can play the electronic instrument 40 in the third sound field having the desired acoustic characteristics. For example, the user U can practice playing the electronic instrument 40 in a sound field that is equivalent to a music hall at which a concert that the user will perform in is scheduled to be held. In addition, the user can play the electronic instrument 40 in a sound field that is equivalent to a world-renowned music hall.

D: MODIFIED EXAMPLES

Specific modified embodiments to be added to each of the embodiments exemplified above are illustrated below. A plurality of embodiments selected freely from the aforementioned embodiments and the following modified examples can be appropriately combined as long as they are not mutually contradictory.

(1) In the embodiments described above, configurations in which the sound field parameter Z (Z1-Z3) includes a plurality of expansion coefficients Bnm(k) corresponding to different spherical harmonics Ynm are shown, but the content of the sound field parameter Z is not limited to the examples described above. An embodiment in which the sound field parameter Z represents the acoustic energy distributions D (D1-D3) on one spherical surface, is also conceivable. For example, the sound field parameter Z1 can represent the acoustic energy distribution D1 of the first sound field and the sound field parameter Z2 can represent the acoustic energy distribution D2 of the second sound field. Similarly, the sound field parameter Z3 representing the acoustic energy distribution D3 of the third sound field also can be used. In addition, the sound field parameter Z1, the sound field parameter Z2, and the sound field parameter Z3 can be parameters of different types or formats. For example, an embodiment in which the sound field parameter Z1 and the sound field parameter Z2 are formed of a plurality of expansion coefficients Bnm(k), and the sound field parameter Z3 represents the acoustic energy distribution D3 of the third sound field, is also conceivable.

(2) In the first embodiment, the peak P3 is placed intermediate between the peak P1 of the acoustic energy distribution D1 and the peak P2 of the acoustic energy distribution D2 to generate the acoustic energy distribution D3 of the third sound field, but the specific procedure of the synthesis process is not limited to the example described above. For example, an embodiment in which a plurality of sound field parameters Z corresponding to different numerical values of the instruction value W are stored in advance in the storage device 22 as selection candidates is also conceivable. Each sound field parameter Z as the selection candidate can be formed of a plurality of expansion coefficients Bnm(k), or be parameters representing acoustic energy distributions D. The position of the peak P3 is different for each selection candidate. In the synthesis process, the control device 21 selects, as the acoustic energy distribution D3 of the third sound field, the selection candidate corresponding to the instruction value W prescribed by the user U, from among the plurality of selection candidates stored in the storage device 22. In the second embodiment as well, an embodiment in which a plurality of sound field parameters Z corresponding to different numerical values of the instruction value W are stored in advance in the storage device 22 as selection candidates is also conceivable.

(3) In the embodiments described above, the K acoustic components C(q, 1)-C (q, K) are generated from the observation signal X(q) by discrete wavelet transform, but the method of generating the K acoustic components C(q, 1)-C(q, K) is not limited to the example described above. For example, K acoustic components C(q, 1)-C(q, K) corresponding to different frequency bands can be generated by discrete Fourier transform performed on the observation signal X(q). However, the above-described embodiment, which uses discrete wavelet transform, has the advantage over an embodiment that uses discrete Fourier transform in being able to achieve both good frequency resolution and time resolution. Note that a filter bank composed of a plurality of band pass filters with different passbands can be used to generate the K acoustic components C(q, 1)-C(q, K) from the observation signal X(q). As can be understood from the foregoing explanation, generation of the acoustic components C(q, 1)-C(q, K) is not limited to computation in the frequency domain and can be realized by computation in the time domain.

(4) In the embodiments described above, an example in which the reproduction system 25 includes a plurality of speakers 251 arranged around the user U is illustrated as an example, but the reproduction system 25 can be headphones that are worn on the head of the user U. Note that headphones include earbuds that are worn in the ears of the user U.

In an embodiment in which the reproduction system 25 consists of headphones, a head-related transfer function (head-related impulse response) is synthesized with the sound field parameter Z3, and the synthesized sound field parameter Z3 is used to control the sound field of the audio signal A. That is, binaural reproduction with which the user U perceives the third sound field is achieved. An embodiment in which a head-related transfer function is convolved with the audio signal A reflecting the sound field parameter Z3 is also conceivable.

(5) In the embodiments described above, the analysis process for generating the sound field parameter Z using the Q observation signals X(1)-X(Q) is executed by the control device 11 of the information providing system 10, but the analysis process can be executed by the control device 21 of the information processing system 20.

(6) For example, it is possible to realize the information processing system 20 in the embodiments described above with a server device that communicates with information terminals, such as smartphones or tablet terminals. The control device 21 of the control system 20 receives the instruction value W corresponding to the instruction from the user U of the information device from said information device by the communication device 23. The control device 21 generates the sound field parameter Z3 of the third sound field by the above-mentioned synthesis process, to which the instruction value W is applied. The control device 21 transmits the sound field parameter Z3 from the communication device 23 to the information device. The information device reproduces the audio signal A to which the sound field parameter Z3 is applied. Note that the audio signal A to which the sound field parameter Z3 is applied can be transmitted from the information processing system 20 to the information device.

(7) As described above, the functions of the information processing system 20 according to the embodiments described above are realized by the collaborative interactions between one or more processors that constitute the control device 21 and a program stored in the storage device 22. The program exemplified above can be stored on a computer-readable storage medium and installed in a computer. The storage medium is, for example, a non-transitory storage medium, a good example of which is an optical storage medium (optical disc) such as a CD-ROM, but can include storage media of any known form, such as a semiconductor storage medium or a magnetic storage medium. Non-transitory storage media include any storage medium that excludes transitory propagating signals and does not exclude volatile storage media. In addition, in a configuration in which a distribution device distributes the program via a communication network, a storage medium that stores the program in the distribution device corresponds to the non-transitory storage medium.

E: ADDITIONAL STATEMENT

For example, the following configurations can be understood from the embodiments exemplified above.

An information processing method according to one aspect (Aspect 1) of this disclosure comprises acquiring a first sound field parameter representing a feature of a first sound field and a second sound field parameter representing a feature of a second sound field having acoustic characteristics different from those of the first sound field, and using the first sound field parameter and the second sound field parameter to generate a third sound field parameter representing a feature of a third sound field having acoustic characteristics different from those of the first sound field and the second sound field. In the aspect described above, the sound field parameter of the first sound field and the sound field parameter of the second sound field are used to generate the sound field parameter of the third sound field. Therefore, it is possible to reproduce various sound fields that are between the first sound field and the second sound field.

The "sound field parameter" is a parameter representing the acoustic feature of a sound field formed in an acoustic space. Specifically, the sound field parameter is a set of a plurality of expansion coefficients Bnm corresponding to different spherical harmonics Ynm, or a parameter (ΣnΣm{Bnm Ynm}) of the distribution of acoustic energy on one spherical surface.

The "first sound field parameter" is calculated using the result of collecting sounds in an acoustic space in which the first sound field is formed, for example. The "second sound field parameter" is calculated using the result of collecting sounds in an acoustic space in which the second sound field is formed, for example. However, the first sound field parameter and the second sound field parameter are not limited to parameters acquired by collecting actual sounds in an acoustic space and can be parameters calculated by computational processing, for example. For example, a sound field parameter generated by the information processing method of this disclosure can be used as either the first sound field parameter or the second sound field parameter, thereby further generating a sound field parameter corresponding to a different sound field.

The "third sound field" is a sound field having characteristics that are different from those of the first sound field and the second sound field, for example. For example, a sound field that is in the process of changing from the first sound field to the second sound field, or vice versa, is the third sound field. That is, the third sound field can be expressed as a sound field having characteristics that are intermediate between those of the first sound field and of the second sound field. Note that "intermediate" means that the characteristics of both the first sound field and the second sound field are reflected, but it is not limited to a sound field on which the first sound field and the second sound field are equally reflected. For example, sound fields on which either the first sound field or the second sound field is more predominantly reflected than the other also are included in the "third sound field." Specifically, an embodiment in which the third sound field parameter is generated from a weighted sum of the first sound field parameter and the second sound field parameter, or an embodiment in which the third sound field parameter is generated such that the peak of the acoustic energy is located at a position intermediate between the peak of the acoustic energy in the first sound field and the peak of the acoustic energy in the second sound field, is also conceivable.

In a specific example (Aspect 2) of Aspect 1, when generating the third sound field parameter, the third sound field parameter, which reflects the first sound field parameter and the second sound field parameter at degrees corresponding to an instruction from the user, is generated. In the aspect described above, the degrees of influence of the first sound field parameter and of the second sound field parameter on the third sound field parameter are controlled in accordance with the instruction from the user. Therefore, it is possible to reproduce the third sound field in accordance with the intention of the user.

In a specific example (Aspect 3) of Aspect 2, when generating the third sound field parameter, the third sound field parameter is generated from the first sound field parameter and the second sound field parameter, by a computation to which an instruction value that changes continuously in accordance with an operation from the user is applied. In the aspect described above, the instruction value that is applied to the generation of the third sound field parameter changes continuously in accordance with the instruction from the user. Therefore, it is possible to generate the third sound field parameter, for any third sound field that is in the process of continuously changing from the first sound field to the second sound field, or vice versa. Note that the instruction value is a numerical value that changes continuously in accordance with an operation of an operator such as a rotatable knob, or an operator such as a slider that can be moved back and forth in a straight line.

In a specific example (Aspect 4) of any one of Aspects 1 to 3, each of a plurality of audio signals supplied to different speakers is further weighted in accordance with the third sound field parameter. In the aspect described above, each of a plurality of audio signals weighted in accordance with the third sound field parameter is supplied to a different speaker. Therefore, a user who listens to sounds emitted from a plurality of speakers can perceive a third sound field that is different from the first sound field and the second sound field.

In a specific example (Aspect 5) of any one of Aspects 1 to 4, each of the first sound field and the second sound field includes a plurality of expansion coefficients corresponding to different spherical harmonics. In addition, in a specific example (Aspect 6) of any one of Aspects 1 to 4, each of the first sound field parameter and the second sound field parameter is a parameter representing the distribution of acoustic energy on one spherical surface. Note that the "distribution of acoustic energy" is, for example, a weighted sum ($\Sigma n \Sigma m\{BnmYnm\}$) of a plurality of spherical harmonics Ynm to which the plurality of expansion coefficients Bnm have been applied as weighted values.

In a specific example (Aspect 7) of any one of Aspects 1 to 5, when generating the third sound field parameter, the third sound field parameter is generated from a weighted sum of the first sound field parameter and the second sound field parameter. In the aspect described above, the third sound field parameter is generated from a weighted sum (for example, average) of the first sound field parameter and the second sound field parameter. Therefore, it is possible to reduce the processing load required for the generation of the third sound field parameter.

In a specific example (Aspect 8) of any one of Aspects 1 to 5, when generating the third sound field parameter, the third sound field parameter is generated such that the acoustic energy in the third sound field is located at a position intermediate between the peak of the acoustic energy of the first sound field and the peak of the acoustic energy of the second sound field. In the aspect described above, the third sound field parameter is generated such that the acoustic energy of the third sound field is located at a position intermediate between the peak of the acoustic energy of the first sound field and the peak of the acoustic energy of the second sound field. Therefore, it is possible to generate a third sound field parameter of a third sound field that allows the listener to clearly perceive acoustic characteristics that are intermediate between those of the first sound field and of the second sound field.

An information processing system according to one aspect (Aspect 9) of this disclosure comprises an acquisition unit for acquiring a first sound field parameter representing a feature of a first sound field and a second sound field parameter representing a feature of a second sound field having acoustic characteristics different from those of the first sound field, and a generation unit that uses the first sound field parameter and the second sound field parameter to generate a third sound field parameter representing a feature of a third sound field having acoustic characteristics different from those of the first sound field and the second sound field. The information processing system includes, in addition to general-purpose computer systems, computer systems for performances, such as electronic instruments.

A program according to one aspect (Aspect 10) of this disclosure causes a computer system to function as an acquisition unit for acquiring a first sound field parameter representing a feature of a first sound field and a second sound field parameter representing a feature of a second sound field having acoustic characteristics different from those of the first sound field, and a generation unit that uses the first sound field parameter and the second sound field parameter to generate a third sound field parameter representing a feature of a third sound field having acoustic characteristics different from those of the first sound field and the second sound field.

What is claimed is:

1. An information processing method realized by a computer system, the information processing method comprising:

acquiring a first sound field parameter representing a feature of a first sound field and a second sound field parameter representing a feature of a second sound field, the first sound field having first acoustic characteristics different from second acoustic characteristics of the second sound field, the first and second sound field parameters being independently acquired and represent different acoustic environments; and generating a third sound field parameter representing a feature of a third sound field by combining the first sound field parameter and the second sound field parameter, the third sound field having third acoustic characteristics different from the first acoustic characteristics and the second acoustic characteristics.

2. The information processing method according to claim 1, wherein the third sound field parameter, which reflects the first sound field parameter and the second sound field parameter at a degree corresponding to an instruction from a user, is generated.

3. The information processing method according to claim 2, wherein the third sound field parameter is generated from the first sound field parameter and the second sound field parameter, by a computation to which an instruction value that changes continuously in accordance with an operation from the user is applied.

4. The information processing method according to claim 1, further comprising weighting each of a plurality of audio signals supplied to different speakers in accordance with the third sound field parameter.

5. The information processing method according to claim 1, wherein each of the first sound field parameter and the second sound field parameter includes a plurality of expansion coefficients corresponding to different spherical harmonics.

6. The information processing method according to claim 1, wherein each of the first sound field parameter and the second sound field parameter is a parameter representing a distribution of acoustic energy on one spherical surface.

7. The information processing method according to claim 1, wherein the third sound field parameter is generated from a weighted sum of the first sound field parameter and the second sound field parameter.

8. The information processing method according to claim 1, wherein the third sound field parameter is generated such that acoustic energy of the third sound field is located at a position intermediate between a peak of acoustic energy of the first sound field and a peak of acoustic energy of the second sound field.

9. An information processing system comprising:

an electronic controller including at least one processor, the electronic controller being configured to acquire a first sound field parameter representing a feature of a first sound field and a second sound field parameter representing a feature of a second sound field, the first sound field having first acoustic characteristics different from second acoustic characteristics of the second sound field, the first and second sound field parameters being independently acquired and represent different acoustic environments, and generate a third sound field parameter representing a feature of a third sound field by combining the first sound field parameter and the second sound field parameter, the third sound field having third acoustic characteristics different from the first acoustic characteristics and the second acoustic characteristics.

10. A non-transitory computer-readable medium storing a program that causes a computer system to execute a process, the process comprising:

acquiring a first sound field parameter representing a feature of a first sound field and a second sound field parameter representing a feature of a second sound field, the first sound field having first acoustic characteristics different from second acoustic characteristics of the second sound field, the first and second sound field parameters being independently acquired and represent different acoustic environments; and generating a third sound field parameter representing a feature of a third sound field by combining the first sound field parameter and the second sound field parameter, the third sound field having third acoustic characteristics different from the first acoustic characteristics and the second acoustic characteristics.

* * * * *